United States Patent [19] [11] 3,953,650
Sauer et al. [45] Apr. 27, 1976

[54] STRAND MATERIAL COVERED WITH CLEAR FLAME RETARDANT COMPOSITION

[75] Inventors: Earl Salvator Sauer, Perry Hall; William Charles Vesperman, Baltimore, both of Md.

[73] Assignee: Western Electric Company, Inc., New York, N.Y.

[22] Filed: Sept. 30, 1974

[21] Appl. No.: 510,665

Related U.S. Application Data

[62] Division of Ser. No. 258,964, June 2, 1972, Pat. No. 3,868,341.

[52] U.S. Cl. .............................. 428/389; 174/110 V; 174/110 E; 252/8.1; 260/DIG. 24; 427/358; 428/418; 428/463; 428/470; 428/522; 428/921
[51] Int. Cl.² ........................ H01B 3/44; H01B 3/40
[58] Field of Search .......... 260/23 EP, 23 XA, 31.8, 260/DIG. 24; 117/137, 232; 174/121, 110, 45.8 SE; 252/8.1; 428/389, 418, 463, 470, 522, 921; 427/358

[56] References Cited
UNITED STATES PATENTS

| | | | |
|---|---|---|---|
| 2,349,413 | 5/1944 | Hemperly | 174/125 |
| 2,717,216 | 9/1955 | Arone | 117/137 X |
| 3,274,135 | 9/1966 | Norman et al. | 260/31.8 |
| 3,558,537 | 1/1971 | Hecker et al. | 260/31.8 |
| 3,657,183 | 4/1972 | Stretanski | 260/23 XA |
| 3,824,202 | 7/1974 | White | 117/232 X |

OTHER PUBLICATIONS
Sarvetnick, Polyvinyl Chloride, p. 126 (1969).

*Primary Examiner*—Harry J. Gwinnell
*Attorney, Agent, or Firm*—E. W. Somers

[57] ABSTRACT

A line cord of a telephone handset having individually insulated conductors is jacketed with an extrudable flexible clear flame retardant composition which includes a polyvinyl chloride resin (PVC), 10 to 55 parts by weight per 100 parts by weight of the PVC of a phthalate plasticizer, 3 to 50 parts by weight per 100 parts by weight of the PVC of a phosphate plasticizer, 2 to 5 parts by weight per 100 parts by weight of the PVC of a metallic stabilizer, 0.25 to 1.0 part by weight per 100 parts by weight of the PVC of a lubricant, 0.25 to 1.0 part by weight per 100 parts by weight of the PVC of an ultraviolet absorber, 1 to 4 parts by weight per 100 parts by weight of the PVC of an epoxy resin, and 1 to 8 parts by weight per 100 parts by weight of the PVC of an epoxy plasticizer.

10 Claims, No Drawings

STRAND MATERIAL COVERED WITH CLEAR FLAME RETARDANT COMPOSITION

This is a division, of appliction Ser. No. 258,964 filed June 2, 1972, now U.S. Pat. No. 3,868,341.

BACKGROUND OF THE INVENTION

1. Field of the Invention

This invention relates to a conductor covered with a clear flame retardant composition, and, more particularly, to an extrudable clear flame retardant polyvinyl chloride composition having flexible properties to facilitate the use thereof to jacket telephone cordage and having protection against degradation by ultraviolet or diffused light.

2. Description of the Prior Art

Most telephone users are familiar with what is referred to in the art as the line or mounting cord which extends the telephone circuit from a connecting block, either floor or wall mounted, to a telephone set. The telephone set consists of the housing and the handset which is connected to the housing by a retractile cord. It has been the custom to color match all of the aforementioned telephone components, that is; the line cord, the housing and handset and the retractile cord. Due to the large number of colors and the several different lengths of cords that are available, installers must maintain an uneconomically large inventory of line and spring cords on service vehicles in order to provide the many combinations of length and color. This large mobile inventory results in excessive inventory holding costs.

To reduce the excessive inventory holding costs, studies were made to ascertain if a single color line cord, which would significantly reduce the number of combinations, could be used. It was decided that this universal color must be neutral in any environment, compliment the telephone set, be aesthetically appealing and be widely accepted by telephone subscribers. At first, a satin silver colored polyvinyl chloride (PVC) jacket composition was selected as the universal color for line cords. Sample cords were manufactured and installed in a product test area, but the acceptability was less than that which had been hoped for.

Subsequently, it was decided to field test a line cord having tinned tinsel conductors individually insulated with a clear nylon material and jacketed with a clear polyvinyl chloride jacket. The tests showed that a cord of this construction and color had aesthetic appeal as indicated by a high acceptance rating in the product test area.

However, although the use of a non-flame retardant clear polyvinyl chloride composition solved the question of what universal color the consumer would accept, other problems arose due to the shortcomings of the clear PVC composition that had been employed.

Clear flame retardant polyvinyl chloride compositions possessing characteristics required for telephone line cord jackets, are not commercially available. To obtain flame retardant characteristics, the prior art approach has been to employ additives such as antimony trioxide. This is sufficient if one is working with opaque formulations but the addition of additives such as antimony trioxide to a clear polyvinyl chloride composition is destructive of clarity. In the case of antimony trioxide, the material becomes milky white in color.

Of course, the composition which is sought must be such that after a clear line cord having acceptable flame retardant properties has been successfully manufactured, the composition remains clear. In this regard, the exposure of the line cord to ultraviolet radiation in sunlit rooms tends to degrade the color of plastic covered cords.

Therefore, it is an object of this invention to provide a conductor covered with a polyvinyl chloride composition which is flame retardant, which is of a clear color, and which is stabilized against degradation by ultraviolet or diffused light. These characteristics are essential to prevent discoloration of the PVC composition in the countless environments in which telephone sets are used.

Yet another object of the proposed invention is to provide a conductor covered with a clear flame retardant PVC composition that possesses self-extinguishing characteristics.

The desire to render inside wiring flame retardant is not without precedent. For example, in the production of textile-served wire which is particularly adapted for use in distributing frames of telephone exchanges, a polyvinyl chloride insulating layer, which includes a suitable flame retardant plasticizer, is extruded over a conductor wire. A textile serving is wrapped over the insulation whereupon the served wire is passed through an impregnation chamber wherein a substantially transparent lacquer coating is applied under pressure to protect the serving.

In an application filed on July 25, 1968, Ser. No. 747,757, now U.S. Pat. No. 3,668,302, there is disclosed a lacquer composition for impregnation of the cotton and which possesses superior flame retardant characteristics. The composition includes a cellulose acetate base, a derivative of cresylic acid and phosphorous oxychloride, as the plasticizer, a brominated monomeric triallyl phosphate as the flame retardant and a solvent.

Of course, while the aforementioned composition is useful in the environment disclosed with the accompanying manufacturing problems associated therewith, the search for a clear flame retardant polyvinyl chloride composition for jacketing line cords demands a composition ideally suited to the specific needs of line cords per se.

To be rated self-extinguishing, the composition must not support combustion under normal atmospheric conditions. In terms of A.S.T.M. under designation D2863, the subject composition should meet a minimum limiting oxygen index (L.O.I.) of 26. The oxygen index is defined as the volume percent of oxygen required to support combustion. The greater the limiting oxygen index, the better are the flame retardant properties of the composition.

Of course, as in the planning of every product, it is necessary to weigh the costs involved. Phosphate materials, which are traditionally of a flame retardant nature, are expensive. Care must be taken to optimize flame retardancy, but at the same time consideration must be given the costs so as not to unduly burden the customer.

The development of a composition is not uncomplicated further by additional demands because of the innumerable environments in which telephones are installed. For example, the final jacketing composition must be flexible and have superior low temperature flexibility properties so that the jacket will not be embrittled in some of the expected environments of use, such as in office buildings prior to placing the heating system in service.

In addition, the clear flame retardant jacketing composition must also be of such a nature as to not mar or damage any lacquered surface such as a desk or table top. If the plastic jacket in contact with such a surface does not possess adequate mar resistance the jacket surface will be permanently damaged.

As can be surmised from the discussion henceforth, there is sought a unique combination of constituents that will provide a telephone cord material tailored to the needs of the customer while still within the bounds of manufacturing economies.

SUMMARY OF THE INVENTION

It is an object of this invention to provide a conductor covered with a clear flame retardant polyvinyl chloride composition which may be reliably extruded as a jacket onto a telephone cordage without undergoing thermal degradation during processing, and which is sufficiently flexible to facilitate the use thereof as a jacketing material for a telephone cordage in a variety of environments.

It is, therefore, another object of this invention to provide a conductor having a flexible jacketing composition having flame retardant properties while also possessing superior low temperature flexibility properties.

Yet a further object of the present invention is the provision of a conductor covered with a clear flame retardant polyvinyl chloride material possessing "lacquer marring" resistance, that is, the cord must be of such a nature that when the cord is placed on a lacquered surface, such as that of a piece of furniture, neither the cord nor the surface will be adversely affected.

An article constructed in accordance with certain features of the invention includes at least one conductor provided with an insulative covering, the covering including a polymeric material which comprises a polymeric material consisting essentially of at least 80 per cent by weight of polyvinyl chloride, 10 to 55 parts by weight per 100 parts by weight of the polymeric material of a phthalate plasticizer, 3 to 50 parts by weight per 100 parts by weight of the polymeric material of a phosphate plasticizer, 2 to 5 parts by weight per 100 parts by weight of the polymeric material of a metallic stabilizer, 0.25 to 1 part by weight per 100 parts by weight of the polymeric material of a lubricant, 0.25 to 1.0 part by weight per 100 parts by weight of the polymeric material of an ultraviolet absorber, 1 to 4 parts by weight per 100 parts by weight of the polymeric material of an epoxy resin, and 1 to 8 parts by weight per 100 parts by weight of the polymeric material of an epoxy plasticizer.

DETAILED DESCRIPTION

The material of which the conductor is constructed is not critical. Commonly used conductors are copper and aluminum as well as alloys of either of these materials. Moreover, it is common practice to tin conductors to aid in making solder joints and no complications are introduced by this conventional procedure. In the presently used environment of the composition embodying the principles of this invention, a telephone cord having tinned tinsel conductors insulated with nylon is jacketed with the inventive composition comprising a polyvinyl chloride (PVC) constituent.

The nylon insulation over the tinned tinsel conductors is transparent as is the PVC jacket. However, it is not necessary that the nylon insulation possess the flame retardant properties characteristic of the PVC jacketing composition of the present invention.

The basic polymer which is utilized in the inventive composition is a polyvinyl chloride (PVC) resin, a homopolymer. The PVC resin has all of the characteristics associated with a homopolymer which includes some abrasion resistance, but which in and of itself is heat unstable. However, when the PVC resin is caused to soften during processing which is necessary to process the compound, the resistance to abrasion is reduced. Further, the PVC must be a suitable electrical grade PVC homopolymer.

Commercial PVC polymers which may contain up to 20 per cent or preferably to a maximum of 10 per cent by weight of comonomers or other admixed material such as propylene may be used without significant adverse effect. For example, PVC acetate or PVC propylene may also be used.

In accordance with the A.S.T.M. standard for 1966, suitable compounds may be classified as within the range of from GP7-4-00005 to GP7-00005 inclusive. Definition of these characteristics are set forth in the A.S.T.M. standard under designation D1755-66. Very briefly, the designation, GP, designates a general purpose resin. The first numerals (entries 4 through 7) represent a polymer molecular weight in terms of solution viscosity and the last digit, 5, indicates the usual preference for an electrical conductivity less than 18 ohms per centimeter per gram. This electrical characteristic is, of course, not a basic requirement from the standpoint of the inventive teaching. The bar under or the bar over a numeral indicates a value less than or more than, respectively, the numeral. The four ciphers in the designations indicate that the properties of particle size, apparent bulk density, plasticizer absorption and dry flow may be any A.S.T.M. designated level, i.e., 1–9, and, therefore, these properties are not critical for the inventive purposes.

It is convenient to discuss concentrations in terms of parts by weight based on 100 parts of PVC homopolymer. Concentrations so designated, therefore, result in compositions having greater than 100 parts.

Combined with the polyvinyl chloride resin to facilitate processing, including the extrusion of, the composition are a monomeric plasticizer, such as a phthalate plasticizer, and a phosphate plasticizer. The choice of a monomeric plasticizer must be an acceptable low temperature plasticizer. An acceptable low temperature plasticizer is one which combines with the polyvinyl chloride resin so as to become inserted between the molecules of the resin. In this way, at low temperatures of say 0°F and below, the low temperature plasticizer acts as bearings or rollers between the PVC resin molecules to maintain the material in a flexible condition.

Another problem arises in attempting to optimize the monomeric plasticizer. Plasticizers are members of the ester family which includes straight chain esters and branch chain esters. The straight chain ester materials are more effective in maintaining flexibility at low temperatures than branch chain materials, i.e., esters having say at least 35% branch chains. But branch chain esters have some advantages over straight chain esters, e.g., better lacquer-mar characteristics.

It is possible to employ any monomeric plasticizer, but depending on the choice, varying properties in the areas of low temperature flexibility and lacquer-mar resistance are obtained. The choice of a monomeric plasticizer must be made as a function of the requirements of the overall composition.

Inappropriate plasticizing constituents within the composition tend to exude from the line cord onto the lacquered surface of table tops on which the telephone handset may be supported. This extractive process causes a white streak to appear on the portion of the table top which had been in engagement with the cord.

A preferred concentration added to the polyvinyl chloride resin is 10–55 parts by weight of the phthalate plasticizer to 100 parts by weight of the homopolymer. If less than 10 parts are employed, additional phosphate plasticizer, which has lubricating properties inferior to the phthalate plasticizer, would be required. Also, the composition would have poorer low temperature flexing properties and poorer long term heat stability. If more than 55 parts are employed, the L.O.I. of the composition begins to decrease and the lacquer-mar resistance of the composition is reduced.

The phthalate plasticizer employed in a composition embodying the principles of the present invention may be a di(N-octyl-n-decyl) phthalate (designated 810P), a di(N-hexyl-n-decyl) phthalate (designated 610P), a di-2-ethylhexyl phthalate (designated D0P), a di-isodecyl phthalate (designated D1DP), a di-iso-octyl phthalate (designated D10P), a diisononyl phthalate (designated D1NP), a ditridecyl phthalate (designated DTDP) or a isodecyltridecyl phthalate (designated IDTP). It has been found that Monsanto 810, as marketed by the Monsanto Chemical Company and having a molecular weight of 418 and a crystallizing point of −30°C, is a suitable phthalate plasticizer.

A phosphate plasticizer must be used in order to render flame retardant the inventive composition. It is a requirement of line cords manufactured in accordance with certain requirements deemed necessary for subscriber installation that a minimum limiting oxygen index of 26 be achieved. Needless to say, the phosphate plasticizer is an essential part of the inventive composition in that the phosphate plasticizer is the constituent which is of assistance in achieving the minimum limiting oxygen index of 26.

The addition of the phosphate plasticizer into the composition also affects advantageously the composition in other ways. For example, the phosphate plasticizer has a secondary effect of rendering the polyvinyl chloride composition processable in a manufacturing line. In addition, the phosphate plasticizer is of assistance in adding to the light stability of the composition.

A preferred concentration of the phosphate plasticizer added to the polyvinyl chloride resin is 3–50 parts by weight of the phosphate plasticizer to 100 parts by weight of the PVC.

A delicate balancing of the number of parts by weight of the phosphate plasticizer in relation to the other constituents of the composition is necessry. If less than 3 parts are employed, the limiting oxygen index requirement is not met. On the other hand, the greater the number of parts by weight of the phosphate plasticizer, the higher the limiting oxygen index. However, although the phosphate plasticizer is of assistance in achieving flame retardancy, the material adds greatly to the overall expense of the composition. For example, commercially available phosphate plasticizers may cost in the range of two to three times the cost of monomeric plasticizers. Also, the use of more than 50 parts decreases the lacquer-mar resistance, the heat stability, the low temperature properties, and the processability of the composition.

The phosphate plasticizer may be a triaryl phosphate such as K-100 as marketed by FMC Chemical Co. Also, a cresyl diphenyl phosphate plasticizer (CDP) marketed by the Monsanto Chemical Company under the designation Monsanto Santicizer 140 has been found suitable as a constituent for the inventive compound. This plasticizer has a molecular weight of 340, an acidity in percent of 0.2 meg/100 grams maximum and a boiling point of 390°C at a pressure of 760 mm of mercury.

Combined with the polyvinyl chloride resin and the phthalate and the phosphate plasticizers is a metallic stabilizer system which may or may not have a liquid carrier. The aforementioned constituent permits the composition to be extruded by an extrusion apparatus thereby rendering the material processable without any discoloration. Discoloration of course, would not be tolerable with subscribers. The addition of stabilizer also results in a crystal clear composition, the ratio of the metals of the composition being maximized to give a clear color with accompanying heat stability.

A metallic stabilizer suitable for purposes of this composition is selected from the group consisting of a metallic stabilizer containing a phosphite chelator, a barium stearate, a cadmium-stearate, a barium-ethylhexoate, a barium-cadmium laurate and a barium cadmium myristate. A metallic stabilizer containing a phosphite chelator includes a barium-cadmium-zinc phosphite stabilizer or a barium-cadmium phosphite. The use of three metallic constituents provides early, intermediate and long term heat stability while the clelator optimizes the effectiveness of these constituents.

A preferred concentration added to the polyvinyl chloride resin and the plasticizers is 2 to 5 parts by weight of a metallic stabilizer to 100 parts by weight of the homopolymer. If less than 2 parts are used, the heat stability of the composition is reduced. More than 5 parts detracts from the heat stability of the composition.

The metallic stabilizer may be present in solid form or dispersed in a carrier. A preferred carrier may include an organic solvent. It has been found that a liquid metallic stabilizer has certain advantages. A liquid metallic stabilizer may be added to the compounding mixture together with the other liquid constituents such as the plasticizers and the other stabilizers to benefit the composition at a very early state of preparation. This stabilizer may be defined as being an emulsion or suspension of the materials in an organic solvent carrier. This dispersion of metals in an organic solution interacts with the polyvinyl chloride and is employed to aid the extrusion process and provide stability. One such barium-cadmium zinc phosphite liquid stabilizer which has been found suitable for purposes of the composition embodying the principles of this invention is available commercially from the Ferro Company under the designation Ferro GH-1. The Ferro GH-1 phosphite stabilizer is a liquid emulsion, a metallic stabilizer dissolved in a liquid and includes a 3.9% barium, 1.9% cadmium, and 0.2% zinc by weight of the total emulsion.

A lubricant is combined with the polyvinyl chloride resin, the plasticizers and the metallic stabilizers. The lubricant is a lubricant selected from the group consisting of a metallic stearate and a stearic acid. Functionally, the lubricant (1) adds synergestically to the maintenance of the clarity by helping to avoid yellowing, (2) adds to the heat stability of the composition, and (3) provides lubrication of the composition in the manufacturing process.

Preferably, a concentration added to the polyvinyl chloride resin is 0.25 to 1 part by weight of the lubricant to 100 parts by weight of the PVC homopolymer. If less than 0.25 part is used, the flow and hence the extrudability of the composition is reduced. Also, the use of a portion of a part outside the low end of the range causes poor mixings, poor flexing, internal heat buildup in processing, reduced heat stability and high shear forces which leads to burn-up of the material in processing. On the other hand, the use of more than 1 part overlubricates and causes slippage in the extruder.

A stearic acid lubricant available commercially from Emory Industries under the designation Emersol 120 has been found to be a suitable lubricant. Emersol 120 has a melting point of 53°–54°C and is double-press dispersed into a fine powder form to be capable of a more complete dispersion in the overall composition.

The lubrication of the composition insures that all of the constituents blend together to obtain a homogeneous mix with an accompanying reduction of internal friction. The lubricant is also of assistance in causing the composition to be moved onto the extrusion screw, to be melted and to be extruded therefrom in a uniform state in an even flow.

In order to provide adequate light stability for the inventive composition, an ultraviolet absorber is combined with the polyvinyl chloride resin, the plasticizers, the metallic stabilizer, and the lubricant. The addition of the ultraviolet absorber is of assistance in avoiding ultraviolet degradation such as when the telephone line cord having the inventive composition covering the conductors is exposed to sunlight. The polyvinyl chloride is caused to remain intact upon exposure to any ultraviolet radiation.

A preferred concentration added to the polyvinyl chloride resin is 0.25 to 1.0 part by weight of the ultraviolet absorber per 100 parts by weight of the PVC homopolymer. If less than 0.25 part is used, there is no real protection against ultraviolet exposure. However, if more than 1.0 part is used, the cost of the composition may become prohibitive. Also, an excessive amount of ultraviolet absorber may plate out of the composition.

One family of ultraviolet absorbers which are available and have been found to be acceptable are the substituted benzophenones such as 4-decyl-2-hydroxybenzophenone and known as Mark 202A as marketed by the Argus Chemical Company. The Mark 202A ultraviolet absorber has a melting point of 120°F and is in the form of a powder having an off-white appearance. The choice of absorber must be made carefully in order to prevent loss of clarity in the resulting composition. Ultraviolet absorbers are manufactured to provide light stability for opaque as well as for clear materials. The choice must be made to select one which provides light stability for a clear compound.

Other substituted benzophenones which are acceptable constituents for the claimed composition include a 2-hydroxy-4-dodecyloxy benzophenone, and a 2-hydroxy-4-N-octoxy benzophenone.

Another family of ultraviolet absorbers which may be added to the polyvinyl chloride resin is the substituted acryonitriles. These may include a 2-ethylhexyl-2-cyano-3,3-diphenyl acrylate available commercially from the General Anline Company under the designation UVINUL N539 or an ethyl-2-cyano-3,3 diphenyl acrylate.

In order to provide additional heat stability for the compound, a low molecular weight epoxy resin is included as a constituent. The epoxy resin has a secondary effect of providing additional light stability for the composition.

A preferred concentration added to the polyvinyl chloride resin is 1 to 4 parts by weight of epoxy resin per 100 parts by weight of the PVC. Should less than 1 part be combined with the PVC, there is a reduction in the heat stability and the extrudability of the composition. Also, the light stability is reduced which may be manifested in early yellowing. If more than 4 parts are used, the long term heat stability is reduced and the cost of the composition is increased.

More particularly, a diglycidyl ester of bisphenol A epoxy (bisphenol A epichlorohydrin epoxy), low molecular weight epoxy resin, having a molecular weight in the range of 350–400 is included as a constituent of the composition. A suitable epoxy resin is marketed by the Shell Chemical Company under the trademark EPON 828, and which is an uncured epoxy (liquid), having an epoxide equivalent of 175–210, an average molecular weight of 350 to 400, and a refractive index at 25°C of 1.570–1.575, and which is a pourable liquid at room temperature. Also suitable are branched di and tri-epoxides manufactured by the condensation of epichlorohydrin and glycerine, an example of which is EPON 812 available from the Shell Chemical Company.

Finally, an epoxy plasticizer is added to the polyvinyl chloride resin to add heat stability and light stability to the composition. The heat stability of the composition must be adequate in two regards, one, the short term heat stability and two, long term heat stability. Without the short term heat stability, it may be necessary to discontinue the operation of the manufacturing line since the composition may be degraded in line and possibly in the extruder. Longer term heat stability prevents discoloration of the composition with the passage of time. Should the composition be lacking in long term heat stability, the insulative covering tends to become yellowish and detract from the overall asthetic appeal of a clear insulation.

Adequate heat stability of the composition avoids yellowness of the conductor covering and lengthens the time between shut downs of the manufacturing facility.

It has been found that a preferred concentration added to the polyvinyl chloride resin is 1 to 8 parts by weight of the epoxy plasticizer per 100 parts by weight of the PVC and 1 to 4 parts of an epoxy resin. These yield synergistic results as regards the heat stability of the composition, that is, the heat stability of the composition is in excess of that to be expected from the addition of the epoxy plasticizer or the epoxy resin alone. In addition, the epoxy plasticizer acts as a secondary plasticizer for the composition. If less than 1 part is used, the composition has far less heat stability, colors early, has decreased extrudability, and reduced low temperature mechanical properties. The employment of more than 8 parts is not compatible with the composition and the plasticizer will exude to the surface. Also, the lacquer-mar resistance is reduced.

An epoxy plasticizer selected from the group consisting of octyl epoxy stearate such as a material available commercially from the Argus Chemical Company and designated Drapex 3, 2 or an octyl epoxy tallate have been found suitable to add the above-mentioned properties into the composition. An octyl epoxy tallate is available under the trade name Drapex 4.4, marketed by the Argus Chemical Company, and has a specific gravity of 9.22 and a molecular weight of 420. An epoxidized soy bean oil or an epoxidized linseed oil have also been found to be acceptable epoxy plasticizers.

Laboratory Brabender heat stability studies supported by actual extrusion trials, demonstrate that the unique combination of additives provides excellent initial clarity as well as long term heat stability.

The hereinbefore described composition has been found to satisfy the requirements of a jacketing material for line cords. Specifically, the composition (1) is flame retardant (2) is clear (3) is extrudable (4) has excellent low temperature properties (5) is flexible (6) includes compatible constituents, i.e., the plasticizers which will not migrate out of the composition and (7) does not produce skin irritations for the customer.

The following examples illustrate various clear flame retardant jacketing compositions prepared in accordance with the invention. In all cases, the structure is that of a conductor such as tinsel conductors with a nylon insulation thereover. Examples are set forth in tabular form. For comparison purposes, all examples set forth were carried out using the homopolymer described hereinbefore. Moreover, all amounts are in parts by weight.

60, per 100 parts by weight of the PVC resin, it is important to recognize that the phosphate must be maintained at not more than 50 parts by weight per 100 parts by weight of the PVC resin. Should the other constituents not be added to this subcombination, the heat stability and low temperature properties of the composition may become unacceptable. On the other hand, if the phosphate constituent in and of itself were used to satisfy the subcombination parts by weight of 60 per 100 parts by weight of the PVC resin, the composition would fail the heat stability test. Moreover, the phosphate constituent, which is primarily used for flame retardancy, is inferior to the phthalate plasticizer with respect to enhancing the low temperature qualities of the composition.

The barium-cadmium-zinc phosphite stabilizer may be varied to effect clarity and heat stability. It is important to recognize that not only is the long term clarity important, but also initial clarity as the material is moved out of the extruder die. A balance between the barium-cadmium-zinc phosphate stabilizer and the epoxy resin is sought to impart heat stability plus the initial clarity to the composition.

An additional subcombination which is of importance to the composition is that of the combined weight of the phthalate plasticizer and the epoxy plasticizer. As long as the combined parts by weight of these two constituents is in excess of 12 parts to 100 parts by weight of the PVC resin, the desired low temperature properties of the compound will be maintained. The main function of the phthalate plasticizer is to achieve the low temperature qualities of the composition while the epoxy plasticizer is included for clarity, heat stability and secondarily for imparting low temperature properties to the composition.

While the phthalate plasticizer and the epoxy plasticizer perform equally as well with regard to the low temperature characteristics of the composition, the

TABLE I

| Ranges | | A | B | C | D | Examples E | F | G | H | I | J | K | L |
|---|---|---|---|---|---|---|---|---|---|---|---|---|---|
| 100 | PVC Resin | 100 | 100 | 100 | 100 | 100 | 100 | 100 | 100 | 100 | 100 | 100 | 100 |
| 10–55 | Phthalate Plasticizer | 20 | 20 | 15 | 20 | 25 | 35 | 10 | 25 | 25 | 18 | 20 | 55 |
| 3–50 | Phosphate Plasticizer | 40 | 40 | 45 | 35 | 35 | 25 | 50 | 35 | 35 | 35 | 35 | 3 |
| 2.0–5.0 | Ba,Cd,Zn, Phosphite Stabilizer | 3 | 3 | 3 | 3 | 3 | 3 | 3 | 2 | 3 | 3 | 5 | 3 |
| 0.25–1.0 | Lubricant | 0.5 | 0.5 | 0.5 | 0.5 | 0.5 | 0.5 | 0.5 | 1 | 1 | 1 | 1 | 0.25 |
| 0.25–1.0 | UV Absorber | 1.0 | 0.5 | 0.5 | 1.0 | 0.5 | 1 | 1.0 | 1 | 1 | 1 | 1 | 0.25 |
| 1.0–4.0 | Epoxy Resin | 3.0 | 3.0 | 3.0 | 3.0 | 3 | 3 | 3 | 4 | 2 | 1.0 | 3 | 3 |
| 1–8.0 | Epoxy Plasticizer | 5.0 | 2.5 | 3.0 | 5.0 | 1.0 | 1.0 | 2 | 3 | 3 | 8 | 5 | 2 |

Referring now to Table I, it is important to recognize that certain subcombinations of the constituents of the inventive composition are necessary in order to achieve certain desirable results. For example, it is important that the combined parts by weight of the phthalate plasticizers, the phosphate and the epoxy plasticizer be at least equal to 60 parts by weight per 100 parts by weight of the PVC resin.

Although subcombinations of the phthalate plasticizer, plus the phosphate, plus the epoxy plasticizer, should have combined parts by weight at least equal to epoxy plasticizer is more expensive than the phthalate. Moreover, increased parts by weight of the epoxy plasticizer engenders lacquer-mar problems.

In arriving at a composition which is processable and which meets the minimum requirements as will be set forth hereinafter with regard to certain ASTM and other tests, a certain degree of heat stability must be maintained. The barium-cadmium-zinc phosphite stabilizer is primarily responsible for heat stability with a secondary function of the epoxy resin and the epoxy plasticizer also being of assistance in imparting heat stability to the composition. Of course, the composition must be structured so that the constituents which give the composition heat stability are compatible with providing the composition with a desired amount of lacquer-mar resistance. Moreover, if the composition is not provided sufficient quantities of plasticizer, the composition will not be provided with adequate shear resistance. On the other hand, an over use of plasticizer will render the composition especially viscous.

Testing

The clear flame retardant composition must possess specified properties, some of which have been described hereinbefore. The following table indicates the properties of a composition having the composition designated Example E in Table I:

TABLE II

TESTS FOR EXAMPLE E

| Properties | Example E | ASTM Testing Spec. No. |
|---|---|---|
| Tensile Strength (psi) | 2500 | D 412 |
| Tensile Stress at 100% Elongation (psi) | 1100 | D 412 |
| Ultimate Elongation Unaged (%) | 430 | D 573 |
| Ultimate Elongation after 2 days Aging (% of Original) | 100 | D 573 |
| Heat Distortion (%) | 18 | D 2219 |
| Tear Resistance (lb./in.) | 450 | D 624 |
| Volatile Loss (%) | 2.7 | D 1203 |
| Specific Gravity | 1.26 | D 792 |
| Low Temperature Brittleness (No. of Failures) | 0 at −15°C | D 746 |
| Finish Mar (%) | 36 | |
| Torsional Resilience (Seconds) | 4 | |
| Modulus in Flexure (psi) | 890 | D 747 |
| Modulus in Flexure after Oil Immersion 5 Days - % of Original | 552 | D 747 |
| Modulus of Rigidity at −10C(psi) | 8000 | D 1043 |
| −20C | 2600 | |
| L.O.I. (%) | 29 | D 2863 |
| Sulfide Staining | None | D 1712 |
| Shear Strength (psi) | 1000 | |

The tensile stress at 100% elongation is a measure of how well an extruded jacket of the inventive composition will elongate under specified conditions of test.

The heat distortion is a measure of how much the cord jacket will distort under heat in terms of per cent distortion from the original configuration. This test is an indication of the ability of the cord to withstand heat should a subscriber inadvertently cause the cord to become engaged with a high temperature surface.

The tear resistance of the composition is an indication of the toughness of a cord having an extruded jacket of the inventive composition as resisting tear, say, when the cord is extended over edges of furniture or other supporting surfaces.

During the extrusion of a covering material of the inventive composition over the tinsel conductors, it is important to be able to maintain a certain volatile loss within specified limits to prevent excessive amounts of the material from going into a gaseous state. The volatile loss is expressed as a per cent of initial quantity of material.

The phosphate plasticizer has low temperature properties at lower than −15°C. No more than two samples out of ten will develop a clean break or cracks at −15° when tested in accordance with A.S.T.M. specification D747.

The torsional resistance of the plastic composition material is an indication of the time required for a specified length of a portion of a material having a specified cross-section to return to an original position after a portion thereof has been deformed through a certan angle. During use, a subscriber's hand, in engagement with the line cord, causes the jacketing composition to exude plasticizers therefrom. When this happens, the flexure strength of the jacketing material is reduced causing the cord to become stiff and possibly break if exposed thereafter to low temperatures. The modulus in flexure after a predetermined immersion in oil is indicative of the ability of the composition to maintain flexure strength when handled by the subscriber.

Test procedures have been devised to determine the lacquer-mar resistance of a composition in terms of the resistance of the composition to exuding constituents onto surfaces in engagement with a cord manufactured with the inventive composition. A sheet of material from which furniture may be constructed is painted with a nitro-cellulose base lacquer and the Rockwell hardness of the surface determined. Then a cord jacketed with the inventive composition is pressed into engagement with the lacquered surface for a predetermined time after which the cord is removed and the hardness of the contacted portions of the surface retested for hardness. The quotient of the difference in the original hardness and the final hardness divided by the original hardness multiplied by 100 yields a per cent softening of the lacquered surface and is referred to as % Finish-Mar. This is an indication of the amount of plasticizer exuding from the composition and causing softening of a lacquered surface.

It is also important that the material having the above-described composition be processable without degradation within an extrusion apparatus. In order to measure the ability of the material to withstand the extrusion process a Laboratory Brabender test is used. The test is designed to be analogous to the extrusion process. In that test, a measured sample of the composition is introduced to a chamber to be subjected to forces by two rotating sigma blades which tend to churn and fuse and hence degrade the material. The time expired to the beginning of degradation of the composition is measured. A measured time in excess of thirty minutes will insure that the material of the inventive composition will not yellow or discolor otherwise during the extrusion process.

In addition, each of the example compositions was found to have acceptable heat stability. This is indicated by the composition's being capable of being subjected to at least a thirty minute run in a Brabender test without being degraded.

Of the properties enumerated in Table II for Example E, the low temperature brittleness, the finishmar resistance, the L.O.I., and the heat stability are among the most important. Test results showing these properties for each of the examples given in Table I are set forth below in Table III.

TABLE III

| Example | A | B | C | D | E | F | G | H | I | J | K | L |
| --- | --- | --- | --- | --- | --- | --- | --- | --- | --- | --- | --- | --- |
| Low Temp Brittleness Temp. °C 0 Failures-10 Samples | −20 | −20 | −15 | −20 | −20 | −15 | −15 | −20 | −20 | −20 | −15 | −15 |
| Finish Mar | 45 | 45 | 45 | 45 | 45 | 36 | 45 | 54 | 54 | 45 | 45 | 45 |
| Limiting Oxygen Index | 29.4 | 29.0 | 31 | 31.5 | 29 | 28.6 | 32.5 | 28.2 | 28.4 | 28.6 | 28.9 | 25.9 |
| Heat Stability (Brabender -minutes) | 50 | 50 | 43 | 48 | 49 | 43 | 31 | 42 | 41 | 47 | 43 | 50 |

Method of Covering Strand Material

In a method of covering strand material such as the tinned tinsel nylon covered conductors with a composition embodying the principles of this invention, the PVC resin is heated to a temperature of approximately 170°C. Then a liquid system is prepared by mixing thoroughly the plasticizers and the stabilizers together with the epoxy plasticizer and resin to obtain a homogeneous mix. The liquid system is then added to the resin system with the application of heat being continued until the temperature is raised to approximately 190°C. Then the powder constituents, the lubricant and the ultraviolet absorber are added and the mixture run for approximately five minutes in a Henchel mixer to heat and fuse together the constituents.

The mixture is then released in the form of a powder to a holding tank. Subsequently, the powder material is moved into an extruder-pelletizer where the material is fused and then cubed into pellets. The pelletized composition is then fed into an extruder typically having three heating zones, first zone being at 320°F and the last zone at 350°F. A typical commercially available extruder may be that shown and described in U.S. Pat. No. 3,579,608, issued May 18, 1971. In this way, the material is in the form of an extremely viscous fluid at the extruder head to permit pressure extrusion thereof about the advancing successive sections of the strand material.

Alternately, all of the constituents may be mixed together in say a Banbury mixer. There are several advantages to this approach in which a fused mixture of the ingredients is produced and then formed into a sheet which is diced into pellets. The overall temperature of this system is less because of rotating blades designed for very intensive mixing. This reduces the possibility of heat degradation of the material. Also, by adding all of the constituents simultaneously, the stabilizers are present to prevent initial heat degradation.

The composition admitted to the extruder is worked thoroughly and moved toward a die end of the extruder. There is some latitude in the selection of extruder screw sizes and speeds as well as operating temperatures in order to successfully extrude the inventive composition about successive sections of the core of tinned tinsel conductors.

The nylon-covered tinsel conductor core is treated with silicone-water spray mixture in order to facilitate stripping of the PVC jacket from the nylon-covered cord during use of the cord. However, if excessive amounts of the silicone-water spray mix is used, the cord will be too well lubricated and the jacket not properly adhered to the nylon cord. Since the successive sections of the PVC-jacketed cord are being advanced by a capstan exerting pulling forces through the external surface of the jacketed cord, a jacket not properly bonded to the core must withstand in and of itself all the pulling forces. This causes what is commonly referred to as stress-crazing, the forming of very small cracks in the jacket, which is detrimental to the integrity and appearance of the jacket material.

It is also important during the processing of the material of the inventive composition using nylon insulated conductors to maintain the conductors in a predetermined path of travel to avoid curvature of the conductors during the extrusion process. Any curved portions of the conductors will result in a portion of the cord having a different refractive index which is readily observable in a clear line cord.

It is to be understood that the above-described arrangements are simply illustrative of the principles of the invention. Other arrangements may be devised by those skilled in the art which will embody the principles of the invention and fall within the spirit and scope thereof.

What is claimed is:

1. An electrical conductor provided with an extrudable coating of a clear flame retardant composition, the composition consisting essentially of a polymeric material consisting essentially of at least 80 per cent, by weight, of polyvinyl chloride; 10 to 55 parts, by weight, per 100 parts, by weight, of the polymeric material of a phthalate plasticizer selected from the group consisting of di(N-octyl-n-decyl) phthalate, di (N-hexyl-n-decyl) phthalate, a di-isodecyl phthalate, di-iso-octyl phthalate, a di-iso-nonyl phthalate, a di-tri-decyl phthalate and a tridecyl phthalate; 3 to 50 parts, by weight, per 100 parts, by weight, of the polymeric material of a phosphate plasticizer selected from the group consisting of triaryl phosphate and cresyl diphenyl phosphate; 2 to 5 parts, by weight, per 100 parts, by weight, of the polymeric material of a metallic stabilizer selected from the group consisting of a metallic stabilizer which includes a phosphite chelator, a barium stearate, a cadmium stearate, a barium-ethylhexoate, a barium-cadmium-laurate and a barium-cadmium myristate; 0.25 to 1.0 parts, by weight, per 100 parts, by weight, of the polymeric material of a lubricant selected from the group consisting of metallic stearate and stearic acid; 0.25 to 1.0 part, by weight, per 100 parts, by weight, of the polymeric material of an ultraviolet absorber selected from the group consisting of substituted benzophenones and substituted acryonitriles; 1 to 4 parts, by weight, per 100 parts, by weight, of the polymeric material of an epoxy resin; and 1 to 8 parts, by weight, per 100 parts, by weight, of the polymeric material of an epoxy plasticizer.

2. The conductor of claim 1, wherein the phthalate plasticizer has a molecular weight in the range of 400 to 440.

3. The conductor of claim 1, wherein the phosphate plasticizer has a molecular weight in the range of 300 to 370.

4. The conductor of claim 1, wherein the metallic stabilizer including a phosphite chelator includes a barium-cadmium-zinc stabilizer with a phosphite chelator and a barium-cadmium stabilizer with a phosphite chelator.

5. The conductor of claim 1, wherein the substituted benzophenone is selected from the group consisting of a 4-decyl-2-hydroxy benzophenone, a 2-hydroxy-4-dodecyloxy benzophenone and a 2-hydroxy-4-N-octoxyl benzophenone.

6. The conductor of claim 1 wherein the substituted acryonitrile is a substituted acryonitrile selected from the group consisting of a 2-ethyl-hexyl-2-cyano-3,3-diphenyl acrylate and an ethyl-2-cyano-3,3 diphenyl acrylate.

7. The conductor of claim 1, wherein the epoxy resin is selected from the group consisting of a diglycidyl ester of bisphenol A epichlorohydrin epoxy and branched di and tri epoxides manufactured by the condensation of epichlorohydrin and glycerine.

8. The conductor of claim 1, wherein the epoxy plasticizer is an epoxy plasticizer selected from the group consisting of an octyl epoxy stearate, an octyl epoxy tallate, an epoxidized soybean oil and an epoxidized linseed oil.

9. The conductor of claim 1, wherein the combined parts, by weight, per 100 parts, by weight, of the polymeric material of the phthalate plasticizer and the epoxy plasticizer is at least equal to 12.

10. The conductor of claim 1, wherein the combined parts, by weight, per 100 parts by weight, of the polymeric material of the phthalate plasticizer, the phosphate plasticizer and the epoxy plasticizer is at least equal to 60.

* * * * *